Feb. 6, 1923. Re. 15,535

L. DEL TURCO.

TERRAZZO FLOORING AND METHOD OF LAYING TERRAZZO.

ORIGINAL FILED FEB. 15, 1921.

INVENTOR.

Louis Del Turco.

BY

Stoyle H. Phelps

ATTORNEY.

Reissued Feb. 6, 1923.

Re. 15,535

UNITED STATES PATENT OFFICE.

LOUIS DEL TURCO, OF NEWARK, NEW JERSEY.

TERRAZZO FLOORING AND METHOD OF LAYING TERRAZZO.

Original No. 1,368,374, dated February 15, 1921, Serial No. 324,165, filed September 16, 1919. Application for reissue filed May 23, 1922. Serial No. 563,103.

*To all whom it may concern:*

Be it known that I, LOUIS DEL TURCO, a citizen of the United States, and a resident of Newark, county of Essex, State of New Jersey, have invented certain new and useful Improvements in Terrazzo Flooring and Methods of Laying Terrazzo, of which the following is a specification.

This invention relates to a strip that is used in making terrazzo and similar floors, being a dividing strip for insertion in a floor not only to define the pattern of the floor, but to localize cracking, if any occurs.

In laying terrazzo floors it has been customary after the underbed has been placed on the foundation, to put the wearing surface or top layer in squares or other forms or patterns, these being laid alternately; that is, some of the squares have been laid out or defined by wooden or similar edges and then laid, and after they are set, the edges were removed and the intervening squares laid. This required considerable time and was expensive and inconvenient, particularly where it was a repair job in a busy place, such as an office of public building corridor.

Furthermore, it has been used to place surface joints on the floor where the squares abut, in an effort to localize cracks to these joints, but in practice it has been found that cracks originate well below the surface, usually in the under bed or foundation, and are transmitted then to the top, and the cracks are therefore not controlled and in no sense confined to the joints.

In my improved strip the joint is carried well below the surface and cracks are much more frequently localized and confined to these points than when these strips are not used. In using my strip it is placed in the under bed when the under bed is wet, and it remains there, and after the under bed is set these strips project from it and the whole top or surface layer in terrazzo or similar floors can be placed on the under bed and the whole floor finished at the same time, and it sets and dries in its entirety as a floor, thus saving considerable time and also considerable expense of labor.

The invention also relates to the method of laying flooring in which strips as described hereinabove are employed when the under bed is laid and before it sets, and which form gages and also dividing strips which are in place when the surface layer is applied.

Figure 1:
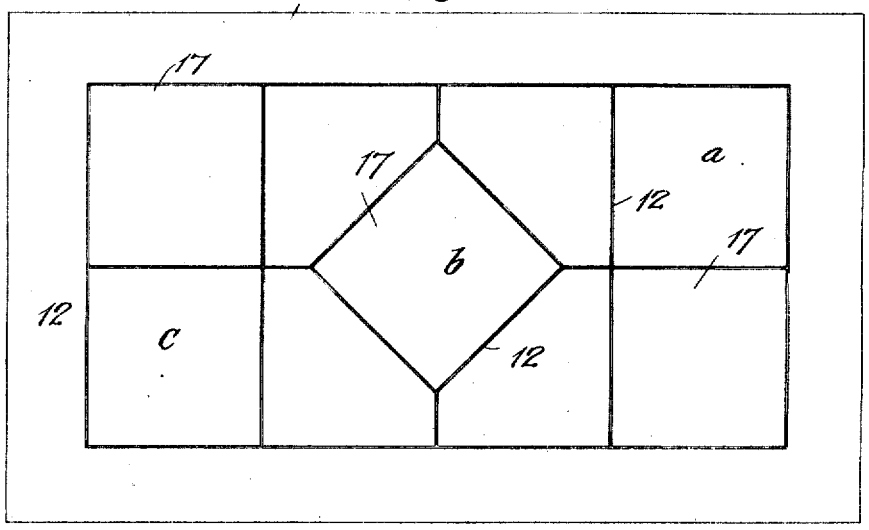
Figure 2:
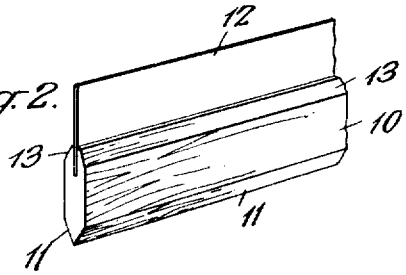
Figure 3:
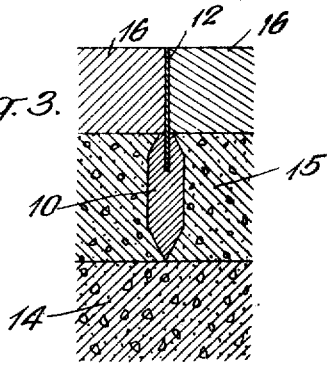
Figure 4:
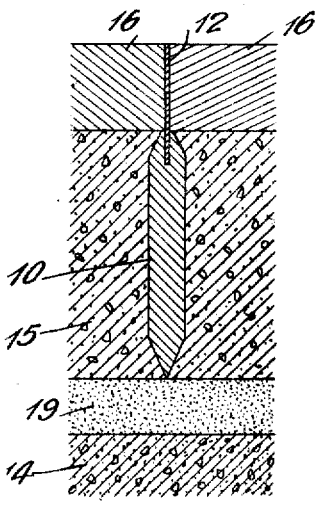

The invention is illustrated in the accompanying drawing, in which Figure 1 is a plan of a floor, showing the manner of use of the dividing strips. Fig. 2 is a perspective view of one end of a strip. Fig. 3 is a section through a part of a floor, showing the strip in position, and Fig. 4 is a similar view showing a modified form of strip as adapted for a different type of floor.

The device consists of a base strip 10, which can be made of various materials, but I prefer to make it of wood, and which is comparatively stiff, being made of a blade-like strip that is broad enough to withstand transverse pressure, but at the same time thin enough to permit its insertion into the mortar under bed of the floor, and to facilitate such insertion I prefer to make the bottom edge pointed or tapered, as at 11. Projecting from the edge opposite the pointed edge 11 is a thin strip 12, preferably of non-rusting metal, the strip 12 being held to the strip 10 by suitable means, the preferred way of making them being to place the strip 12 in a groove in the edge of the wooden strip, so that no other fastening means are required. It is usual to have the major portion of the strip 12 projecting so that but a small part of its surface is used for fastening it in place. In order to prevent the tapered end 11 acting to force the strip upward when the mortar under bed is drying or setting, I prefer to chamfer the top edges of the strip 10, as at 13.

When laying a floor the structure is usually provided beforehand with the concrete foundation 14, and in Fig. 3 I show a structure in which the motar under bed 15 is placed on the foundation and the workmen, after the under bed 15 is laid insert the dividing strips, forcing the strip 10 down into the motar under bed, as shown in Fig. 3 so that the top edge of the strip 12 defines the level of the top of the finished floor. The wearing surface or top surface 16 is laid after the under bed 15 has set, and the whole floor can be laid without waiting for any one portion of it to set before the other portion is commenced.

In Fig. 1 I show the strips in position to define a conventional form of floor, the panels 17 and the border 18 being adapted to be laid at the same time when these dividing strips are used. As previously made, it was necessary to take the separated panels such as *a*, *b* and *c*, and define them by strips of wood or otherwise, lay them and allow them to dry and become thoroughly set, and when this had been done to remove the edge strips and lay other sections, and in this way the floor was finished only after the laying of alternate sections had been completed, this taking up a great deal of time and being expensive on this account, and also due to the loss of time incidental to the non-use of the floor, which is particularly inconvenient in public places, both in new structures and also on the re-laying of floors.

In Fig. 4 I show a cross-section of flooring in which a layer of sand 19 is placed between the foundation 14 and the under bed 15, this layer of sand very often being used where undue cracking is anticipated, and if the foundation 14 cracks, the crack does not penetrate through the same to the under bed 15. The under bed 15 in this case is shown much thicker than the one in Fig. 3, and, if desired, the strip, 10 can be made much longer, as is well illustrated in Fig. 4, to extend from the top to the bottom of the under bed. The partition strip extending from near the concrete foundation to the top or wearing surface of the floor provides a place where cracking in the floor is very apt to localize, and the cracking, simply being a separation adjacent to the strip, is easily filled and does not mar the appearance of the floor.

This is a big improvement over the situation where the division between the panels was only in the wearing surface and was indicated by a shallow groove on the top face of the floor.

I claim:

1. A device for use in laying terrazzo and similar flooring comprising a blade-like wooden base strip and a thin metal strip projecting from one edge of the base strip, the major portion of the metal strip projecting.

2. A device for use in laying terrazzo and similar flooring, comprising a base strip with a pointed edge, and a thin strip projecting from the opposite edge of said base strip.

3. The improved method for laying terrazzo flooring which consists in laying the underbed, the provision of a thin strip, forcing such strip vertically in the underbed while the underbed is still wet, said strip projecting from the top surface of said underbed with its top edge establishing approximately the level of the top surface, permitting said underbed to set, and then applying the top surface.

4. A terrazzo flooring comprising an underbed, a top layer and a plurality of strips, said strips having lower bases in the underbed and upper extensions terminating substantially at and dividing the surface of the top layer, the lower bases being of different material from the upper extensions.

5. A terrazzo flooring, comprising an underbed, a top layer and a plurality of strips, said strips having lower wooden bases in the underbed and upper metallic extensions terminating substantially at and dividing the surface of the top layer.

6. The method of laying terrazzo flooring, comprising inserting strips in a wet underbed, allowing the latter to set, and then applying a top layer on the underbed, said strips being inserted so that their upper edges will be substantially level with and will divide the surface of the completed terrazzo flooring.

7. The method of laying terrazzo flooring, comprising inserting strips in a wet underbed, allowing the latter to set, and then applying a top layer on the underbed, said strips being inserted so that their upper edges will be substantially level with and will divide the surface of the completed terrazzo flooring, and said strips having wooden bases and thin metallic extensions thereof, the wooden bases being in the underbed.

8. The method of laying terrazzo flooring in consecutive sections, comprising inserting strips in a wet underbed, allowing the latter to set, and then applying a top layer on the underbed, said strips being inserted so that their upper edges will be substantially level with and will divide the surface of the completed terrazzo flooring.

9. The method of laying terrazzo flooring in consecutive sections, comprising inserting strips in a wet underbed, allowing the latter to set, and then applying a top layer on the underbed, said strips being inserted so that their upper edges will be substantially level with and will divide the surface of the completed terrazzo flooring, and said strips having wooden bases and thin metallic extensions thereof, the wooden bases being in the underbed.

10. A terrazzo flooring comprising an underbed, a top layer and a plurality of strips, said strips having lower bases dividing the underbed and upper extensions terminating substantially at and dividing the surface of the top layer the lower bases being of different material from the upper extensions.

11. A terrazzo flooring, comprising an underbed, a top layer and a plurality of strips, said strips having lower wooden bases dividing the underbed and upper metallic extensions terminating substantially at and dividing the surface of the top layer.

LOUIS DEL TURCO.